United States Patent
Kunieda et al.

(10) Patent No.: US 10,913,242 B2
(45) Date of Patent: Feb. 9, 2021

(54) TITANIUM MATERIAL FOR HOT ROLLING

(71) Applicant: NIPPON STEEL & SUMITOMO METAL CORPORATION, Tokyo (JP)

(72) Inventors: Tomonori Kunieda, Tokyo (JP); Yoshitsugu Tatsuzawa, Tokyo (JP); Hideki Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 367 days.

(21) Appl. No.: 15/746,512

(22) PCT Filed: Jul. 29, 2016

(86) PCT No.: PCT/JP2016/072339
§ 371 (c)(1),
(2) Date: Jan. 22, 2018

(87) PCT Pub. No.: WO2017/018517
PCT Pub. Date: Feb. 2, 2017

(65) Prior Publication Data
US 2018/0200766 A1 Jul. 19, 2018

(30) Foreign Application Priority Data
Jul. 29, 2015 (JP) .................. 2015-149399

(51) Int. Cl.
*B32B 15/01* (2006.01)
*C22C 14/00* (2006.01)
(Continued)

(52) U.S. Cl.
CPC .............. *B32B 15/01* (2013.01); *C22C 14/00* (2013.01); *B21B 1/02* (2013.01); *B21B 1/026* (2013.01);
(Continued)

(58) Field of Classification Search
None
See application file for complete search history.

(56) References Cited

U.S. PATENT DOCUMENTS

| | | | | |
|---|---|---|---|---|
| 3,070,881 A | * | 1/1963 | Brooks ................ | B23K 20/233 228/158 |
| 5,579,988 A | * | 12/1996 | Schutz .................. | B23K 20/04 228/186 |
| 6,857,558 B2 | * | 2/2005 | Ferry, III ............. | B23K 20/023 228/190 |

FOREIGN PATENT DOCUMENTS

| CN | 2790619 | 6/2006 |
|---|---|---|
| CN | 103459063 | 12/2013 |

(Continued)

OTHER PUBLICATIONS

English machine translation of JP S62-124265, EPO, accessed Sep. 20, 2019.*

(Continued)

*Primary Examiner* — Xiaobei Wang
(74) *Attorney, Agent, or Firm* — Clark & Brody LP

(57) ABSTRACT

A titanium material for hot rolling 1 includes a titanium cast piece 3, and titanium sheets 4 that are welded to faces corresponding to rolling surfaces 3a of the titanium cast piece 3. The titanium cast piece 3 and the titanium sheets 4 have the same kind of chemical composition. The titanium material for hot rolling 1 can maintain good surface properties after hot rolling even if a slabbing process or a finishing process is omitted.

30 Claims, 1 Drawing Sheet

(51) Int. Cl.

| | |
|---|---|
| B21B 1/38 | (2006.01) |
| B21B 3/00 | (2006.01) |
| B23K 9/167 | (2006.01) |
| B23K 9/23 | (2006.01) |
| B23K 10/02 | (2006.01) |
| C22F 1/00 | (2006.01) |
| C22F 1/18 | (2006.01) |
| B21B 1/02 | (2006.01) |
| B23K 15/00 | (2006.01) |

(52) U.S. Cl.
CPC . *B21B 1/38* (2013.01); *B21B 3/00* (2013.01); *B23K 9/167* (2013.01); *B23K 9/23* (2013.01); *B23K 10/02* (2013.01); *B23K 15/00* (2013.01); *B23K 15/0093* (2013.01); *C22F 1/00* (2013.01); *C22F 1/18* (2013.01); *C22F 1/183* (2013.01); *Y10T 428/12806* (2015.01)

(56) References Cited

FOREIGN PATENT DOCUMENTS

| EP | 0 064 243 | 11/1982 |
|---|---|---|
| JP | 60-009866 | 1/1985 |
| JP | 62-124265 | 6/1987 |
| JP | 01-156456 | 6/1989 |
| JP | 07-102351 | 4/1995 |
| JP | 08-060317 | 3/1996 |
| JP | 11-179566 | 7/1999 |
| JP | 2007-332420 | 12/2007 |
| JP | 2009-068098 | 4/2009 |
| JP | 4414983 | 2/2010 |
| RU | 2146568 | 3/2000 |
| RU | 2011117821 | 11/2012 |
| RU | 2484176 | 6/2013 |
| WO | 2010/090352 | 8/2010 |
| WO | 2010/090353 | 8/2010 |

OTHER PUBLICATIONS

English machine translation of JP 2009-068098, EPO, accessed Sep. 20, 2019.*

Kenneth H. Holko, "Hot Press and Roil . . . With Auto-Vacuum Cleaning", National Aeronautics and Space Administration, Sep. 1972.

S.G. Glazunov, "Metallography of Titanium Alloys", M. Metallurgia, 1980, pp. 208-226.

N.F. Anokhin, "Workpieces from Ti Alloys", M. Metallurgia, 1979, pp. 143-158.

* cited by examiner

TITANIUM MATERIAL FOR HOT ROLLING

TECHNICAL FIELD

The present invention relates to a titanium material for hot rolling.

BACKGROUND ART

A titanium product is generally produced by forming an ingot obtained from a melting process into a slab or billet shape in a slabbing or blooming (hereinafter referred to as "slabbing") process, and after trimming the surface, performing hot rolling and then performing annealing or cold working.

In addition to the widely used vacuum arc remelting (VAR) process, an electron beam remelting (EBR) process, a plasma arc melting process in which melting is performed at a separate location from a mold and the resultant molten metal is then poured into the mold, and the like are also available as melting processes.

In the former case, because the mold is limited to a cylindrical shape, it is necessary to perform a slabbing process or a forging process to produce a sheet or plate (hereinafter referred to as "sheet"). In contrast, in the latter case, there is a high degree of freedom with respect to the mold shape, and as well as a cylindrical shape, a rectangular mold can also be used. Accordingly, a rectangular ingot or a cylindrical ingot can be directly cast in a mold by using the electron beam remelting process or plasma arc melting process. Therefore, in the case of producing a sheet from a rectangular ingot, or in the case of producing a bar material or a wire rod from a cylindrical ingot, from the viewpoint of forming the shape of the ingot, it is possible to omit a slabbing process or a forging process, and since the cost and time required for a slabbing process can therefore be eliminated, a significant increase in production efficiency can be expected.

However, the cast microstructure of a large size ingot that is used industrially includes coarse grains having grain sizes that range up to several tens of mm. If such an ingot is directly subjected to hot rolling without undergoing a slabbing process, unevenness arises on the surface due to the influence of intergranular deformation anisotropy that is attributable to coarse grains, and consequently surface defects occur.

Thus, when a rectangular ingot or a cylindrical ingot is directly produced by an electron beam remelting or plasma arc melting process, and a hot rolling is performed without performing a slabbing process or a forging process, surface defects occur during the hot rolling. In order to remove surface defects that occurred during the hot rolling, it is necessary to increase the amount of picking of the surface of the hot-rolled sheet in the pickling process, and consequently the cost increases and the yield deteriorates. That is, it is necessary to newly introduce a finishing process for removing surface defects.

Therefore, there is a concern that the expected improvement in production efficiency to be achieved by omission of a slabbing process or a forging process will be cancelled out by newly introducing such a finishing process. In regard to such a concern, a method for producing titanium material for hot rolling and a method of reducing surface defects of a titanium product by performing working or heat treatment after production have been proposed.

JP01-156456A (Patent Document 1) discloses a method that, in the case of omitting a slabbing process and directly hot-working a titanium ingot, strain is imparted to the surface layer to refine the grains near the outer layer, and thereafter the surface is recrystallized to a depth of 2 mm or more by heating to the recrystallization temperature or higher. Forging, rolling reduction, shot blasting and the like are mentioned as examples of means for imparting the strain.

JP08-060317A (Patent Document 2) discloses a method that, by heating a titanium ingot to Tβ+50° C. or more, then cooling the ingot to Tβ−50° C. or less, and thereafter subjecting the ingot to hot rolling, reduces waviness or creases on the surface that are formed during rolling due to deformation anisotropy of coarse grains, to thereby reduce surface defects.

JP07-102351A (Patent Document 3) discloses, as a method for reducing surface defects of a titanium product in a case where the titanium product undergoes a slabbing process, a method that sets the temperature when finishing a slabbing process to a temperature in the a phase region or that further performs heating at a temperature in the a. phase region prior to hot rolling to thereby make an area that is 60 μm or more from the surface an area of equiaxial crystals. By this means, the occurrence of a situation in which an oxygen-rich layer becomes partially deeper can be avoided, the oxygen-rich layer can be removed in a descaling process, and a portion of non-uniform hardness or ductility is eliminated, and hence the surface properties after cold working are improved.

JP2007-332420A (Patent Document 4) discloses a method in which, in a case where a titanium ingot is directly subjected to hot rolling without being first subjected to a hot working process, an outer layer of a face corresponding to a rolling surface of the ingot is melted and resolidified by high-frequency induction heating, arc heating, plasma heating, electron beam heating, laser heating or the like, to thereby refine the grains in an area from the outer layer to a depth of 1 mm or more and improve the outer layer microstructure of the titanium product after hot rolling. This method prevents the occurrence of surface defects by forming a solidified microstructure that is a fine microstructure having irregular orientations by subjecting the near-surface portion to rapid solidification. High-frequency induction heating, arc heating, plasma heating, electron beam heating and also laser heating are mentioned as examples of methods for melting the outer layer microstructure of a titanium slab.

WO 2010/090352 (Patent Document 5) discloses a method that imparts dimples having an average height of 0.2 to 1.5 mm and an average length of 3 to 15 mm of elements with undulating contour curves to titanium material for hot rolling by cold plastic deformation to thereby make the surface defects on a titanium product that arise due to hot rolling minor even when a process of breaking down an ingot is omitted.

In addition, WO 2010/090353 (Patent Document 6) discloses a method that, even when a hot working process is omitted, provides an excellent casting skin and can improve surface defects after hot rolling in a case where, in a cross-sectional microstructure of a titanium slab that was melted in an electron-beam remelting furnace and extracted directly from a mold, an angle θ formed by the solidification direction from the outer layer toward the interior and the casting direction of the slab is in the range of 45 to 90°, or in a case where, in the crystal orientation distribution of the outer layer, an angle formed by the c-axis of hcp and the normal to the slab outer layer is in the range of 35 to 90°. That is, the occurrence of such defects attributable to coarse grains can be suppressed by controlling the shape and crystal orientation of grains in the surface.

LIST OF PRIOR ART DOCUMENTS

Patent Documents

Patent Document 1: JP01-156456A
Patent Document 2: JP08-060317A
Patent Document 3: JP07-102351A
Patent Document 4: JP2007-332420A
Patent Document 5: WO 2010/090352
Patent Document 6: WO 2010/090353

SUMMARY OF INVENTION

Technical Problem

However, although the method disclosed in Patent Document 1 describes shot blasting as means for imparting strain, the depth of the strain imparted by general shot blasting is no more than approximately 300 to 500 μm, which is not sufficient for forming a recrystallized layer having a depth of 2 mm or more that is necessary for improving the quality. Therefore, although in practice it is necessary for the strain to be imparted to a deeper position by forging or rolling reduction, large facilities are required in order to perform forging or rolling reduction on large size ingots for hot rolling, and there is no reduction in cost in comparison to a normal slabbing process.

The method disclosed in Patent Document 2 has an effect such that coarse grains recrystallize and are refined by heating to a temperature in the β phase region. However, in a case where a slabbing process is omitted, there are few recrystallized nuclei because no working strain is applied, and the grains coarsen because the cooling rate after the heating is slow since the whole ingot is heated, and hence the refinement effect obtained by recrystallization is limited and a reduction in the deformation anisotropy is not sufficient. Further, the fact that the influence of the crystal orientation of the original coarse grains is received even after being recrystallized is also a reason why deformation anisotropy is not eliminated. On the contrary, moderate refinement leads to an increase in the grain boundaries which are the cause of unevenness on the surface, and the occurrence of surface defects increases.

The method disclosed in Patent Document 3 is performed on the premise that the cast microstructure is broken and the grains are refined and equiaxed by undergoing a slabbing process, and is meaningless in a case where a slabbing process is omitted. Even if the slabbing process were omitted and only a heat treatment were performed to form equiaxed grains at a depth of 60 μm or more from the surface, that would merely be a case of recrystallization, and the crystal orientation of the grains would be influenced by the original crystal orientation. Accordingly, the method is insufficient for preventing unevenness that is attributable to deformation anisotropy caused by coarse grains of the as-cast microstructure, and it is evident that problems caused by surface defects will occur.

According to the method disclosed in Patent Document 4, modification of the microstructure of the near-surface portion of an ingot is performed to improve the surface properties after hot rolling. However, there is a concern that there is a possibility that if the Fe content in the near-surface portion of the ingot is insufficient, the grains in the near-surface portion with modified microstructure will coarsen and the surface properties will deteriorate. Further, prior to modifying the microstructure of the outer layer, the outer layer of the ingot is finished by cutting or the like, and the yield decreases.

According to the method disclosed in Patent Document 5, modification of the microstructure of the near-surface portion of an ingot is performed when cold to improve the surface properties after hot rolling. However, in the case of performing modification of the microstructure of the outer layer when cold, even if the modification is performed directly on the as-cast casting skin, it is predicted that it will be difficult to remove all casting defects such as cracks in the casting skin that occurred during the casting, and the possibility that a finishing process such as cutting cannot be omitted is a concern.

In addition, according to the method disclosed in Patent Document 6, due to variations in operating conditions when casting, controlling the microstructure when the target of the control is the whole area of the ingot is difficult to achieve, and there is a concern that, depending on the case, surface defects that are attributable to a coarse, cast microstructure may occur and the surface properties will deteriorate.

The present invention has been conceived in consideration of the foregoing problems of the conventional technology, and an objective of the present invention is to provide a titanium material for hot rolling which can maintain good surface properties of a titanium product after hot rolling even when a slabbing process and a finishing process are omitted.

Solution to Problem

In order to attain the above objective, the inventors of the present invention conducted intensive studies and as a result found that when producing a titanium product from an ingot by performing hot rolling and omitting a slabbing process and a finishing process, by using titanium material for hot rolling in which titanium sheets with fine-sized grains are attached to the surfaces of a titanium cast piece, the microstructure of faces corresponding to a rolling surfaces can be made a microstructure with fine grains, and as a result surface defects of a titanium product that are caused by the influence of deformation anisotropy that is attributable to an as-cast coarse solidified microstructure can be reduced and surface properties equivalent to surface properties in a case where titanium material undergoes a slabbing process can be obtained, and based on this finding the inventors of the present invention conducted further studies to complete the present invention. The present invention is as described hereunder.

(1) A titanium material for hot rolling, including a titanium cast piece, and a titanium sheet welded to a face corresponding to a rolling surface of the titanium cast piece; wherein the titanium cast piece and the titanium sheet have a same kind of chemical composition as each other.

(2) The titanium material for hot rolling according to (1) above, wherein a thickness of the titanium sheet is within a range of 1 mm to 20 mm.

(3) The titanium material for hot rolling according to (1) or (2) above, wherein a grain size of the titanium sheet is less than 1 mm.

(4) The titanium material for hot rolling according to any one of (1) to (3) above, wherein the titanium cast piece is a titanium slab produced by electron beam remelting or plasma arc melting.

(5) The titanium material for hot rolling according to any one of (1) to (4) above, wherein the welding is electron beam welding, plasma arc welding or tungsten inert gas welding.

(6) The titanium material for hot rolling according to any one of (1) to (5) above, wherein the welding is performed in a vacuum.

Advantageous Effects of Invention

A titanium material for hot rolling according to the present invention enables the production of a titanium product that, even when a hot working process such as slabbing or forging that has been conventionally required when producing a titanium product is omitted, has surface properties that are equal to or better than the surface properties obtained in a case where the hot working process is performed, and since a reduction in the heating time and an improvement in the yield that is achieved by reducing the amount of pickling as a result of improving the surface quality are realized by omitting the hot working process, not only there is an effect of reducing the production cost but there is also a significant effect on enhancement of the energy efficiency, and thus the industrial effects are immeasurable.

DESCRIPTION OF EMBODIMENTS

The present invention is described in further detail hereunder. Note that, in the following description, unless otherwise specified, "%" relating to the chemical composition means "mass percent".

Figure 1:
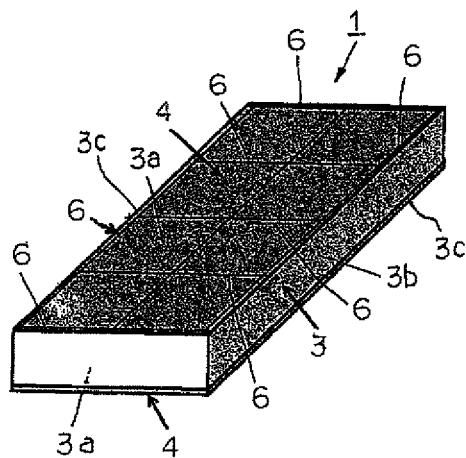
FIG. 1 is an explanatory drawing schematically illustrating a titanium material for hot rolling according to the present invention that includes titanium sheets that have the same chemical composition as a titanium cast piece (titanium slab) and that are welded to surfaces that are faces corresponding to rolling surfaces of the titanium cast piece.

FIG. 1 is an explanatory drawing schematically illustrating a titanium material for hot rolling 1 according to the present invention that includes titanium sheets 4 and 4 that have the same chemical composition as a titanium cast piece (titanium slab) 3 and that are welded to surfaces that are faces corresponding to rolling surfaces 3a and 3a of the titanium cast piece 3.

Figure 2:
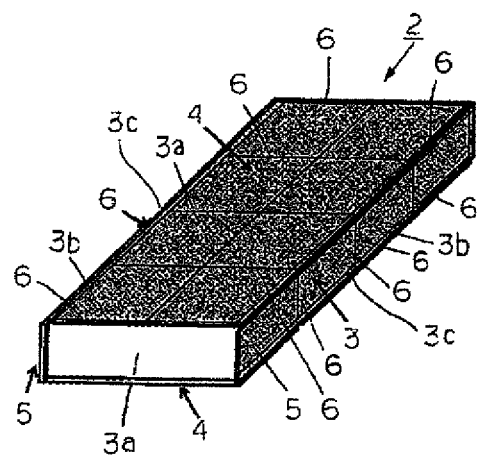
FIG. 2 is an explanatory drawing schematically illustrating another titanium material for hot rolling according to the present invention in which titanium sheets having the same chemical composition as a titanium cast piece are attached by welding to not only faces corresponding to the rolling surfaces of the titanium cast piece but also to side faces thereof.

Further, FIG. 2 is an explanatory drawing schematically illustrating another titanium material for hot rolling 2 according to the present invention in which titanium sheets 5 and 5 having the same chemical composition as the titanium cast piece 3 are attached by welding to not only faces corresponding to the rolling surfaces 3a and 3a of the titanium cast piece 3 but also to side faces 3b and 3b thereof.

Note that, reference numeral 6 in FIGS. 1 and 2 denotes weld zones (weld lines) between the titanium cast piece 3 and the titanium sheets 4 and 5.

As illustrated in FIGS. 1 and 2, in the titanium materials for hot rolling 1 and 2, the titanium sheets 4 and 4 having the same specifications (chemical composition) as the titanium cast piece 3 are affixed by welding to surfaces that are faces corresponding to rolling surfaces 3a and 3a of the titanium cast piece 3.

As described later, the microstructure of the titanium sheets 4 and 4 that are affixed by welding has extremely fine grains. Consequently, by affixing the titanium sheets 4 and 4 to the titanium cast piece 3, the grains of faces corresponding to rolling surfaces of the titanium materials for hot rolling 1 and 2 can be simply and reliably refined during hot rolling, and by this means the occurrence of surface defects caused by the influence of deformation anisotropy of the as-cast, coarse solidified microstructure of the titanium cast piece 3 can be lessened or eliminated, and a titanium product that is excellent in surface properties is obtained.

According to the present invention, in both a case where the titanium cast piece 3 is a commercially pure titanium and a case where the titanium cast piece 3 is a titanium alloy, the aforementioned effect can be obtained by affixing the titanium sheets 4 and 4 that have the same chemical composition as the titanium cast piece 3 to the titanium cast piece 3.

Here, the term "commercially pure titanium" includes commercially pure titanium as specified for Class 1 to Class 4 of the JIS Standards, and commercially pure titanium corresponding thereto that is specified for Grades 1 to 4 of the ASTM standards and 3.7025, 3.7035 and 3.7055 of the DIN standards.

That is, it can be said that the commercially pure titanium that is the object of the present invention consists of C: 0.1% or less, H: 0.015% or less, O: 0.4% or less, N: 0.07% or less and Fe: 0.5% or less, with the balance being Ti. In addition, high corrosion resistant alloys that are called "modified (improved) pure titanium" in which some amount of one or more platinum group elements is added to the above materials (ASTM Grades 7, 11, 16, 26, 13, 30, and 33 or JIS Classes corresponding to these ASTM Grades, and titanium products in which small amounts of various elements are further contained) are also included in the term "commercially pure titanium" in the present invention.

Further, a titanium alloy is usually molded into a sheet by hot rolling or cold rolling, and is also produced as a product in the form of a wire rod, a bar material or the like. In this case, an α-type titanium alloy, an α+β-type titanium alloy, or a β-type titanium alloy can be applied as the titanium alloy. Hence, in the present invention, the chemical composition of the titanium alloy is not particularly limited.

Table 1 shows elements which, when contained in a titanium alloy, are known to contribute to improving the characteristics of the titanium alloy. A titanium alloy according to the present invention can impart a target function to the surface of a titanium product by containing, for example, by mass %, more than 0% of one or more types of element selected from the group consisting of: O: 0 to 0.5%, N: 0 to 0.2%, C: 0 to 2.0%, Al: 0 to 8.0%, Sn: 0 to 10.0%, Zr: 0 to 20.0%, Mo: 0 to 25.0%, Ta: 0 to 5.0%, V: 0 to 30.0%, Nb: 0 to 40.0%, Si: 0 to 2.0%, Fe: 0 to 5.0%, Cr: 0 to 10.0%, Cu: 0 to 3.0%, Co: 0 to 3.0%, Ni: 0 to 2.0%, platinum group elements: 0 to 0.5%, rare earth elements: 0 to 0.5%, B: 0 to 5.0%, and Mn: 0 to 10.0%.

Elements which can be contained in titanium which are other than the above elements are elements that can improve strength by solid-solution strengthening or precipitation strengthening (there are cases where elements do not dissolve and cases where elements cause a precipitate to form), or depending on the element that is contained, can improve creep characteristics, which are known as common knowledge pertaining to metal materials. Elements from, in terms of atomic number, hydrogen (1) to astatine (85) (however, excluding the noble gas elements that are Group 18 elements) are exemplified as these elements, and up to approximately 5% in total of these elements is allowed.

The balance other than the above elements is Ti and impurities. The impurities can be contained in a range that does not inhibit the target characteristics, and other impurities are impurity elements that mainly get mixed in from the raw material or scrap and elements that get mixed in during production, with C, N, O, Fe, H, and the like being elements that are representative examples thereof, and in addition there are elements such as Mg and Cl that get mixed in from raw material, and elements such as Si, Al and S that get mixed in during production. It is considered that a range in which these elements do not inhibit the target characteristics of the present application is not more than approximately 2%.

V: 2.0 to 25.0%, Nb: 0.15 to 5.0%, Si: 0.1 to 1.0%, Fe: 0.05 to 2.0%, Cr: 0.2 to 5.0%, Cu: 0.3 to 2.0%, Co: 0.05 to 2.0%, Ni: 0.1 to 1.0%, platinum group elements: 0.02 to 0.4%, rare earth elements: 0.001 to 0.3%, B: 0.1 to 5.0%, and Mn: 0.2 to 8.0%, and further preferably contains one or more types of element selected from the group consisting of: O: 0.03 to 0.3%, N: 0.01 to 0.1%, C: 0.01 to 0.5%, Al: 0.4 to 5.0%, Sn: 0.2 to 3.0%, Zr: 0.5 to 5.0%, Mo: 0.5 to 15.0%, Ta: 0.2 to 2.0%, V: 5.0 to 20.0%, Nb: 0.2 to 2.0%, Si: 0.15 to 0.8%, Fe: 0.1 to 1.0%, Cr: 0.2 to 3.0%, Cu: 0.3 to 1.5%, Co: 0.1 to 1.0%, Ni: 0.1 to 0.8%, platinum group elements: 0.03 to 0.2%, rare earth elements: 0.001 to 0.1%, B: 0.2 to 3.0%, and Mn: 0.2 to 5.0%.

TABLE 1

| Element | (mass %) | | | Main role Purpose |
| --- | --- | --- | --- | --- |
| | Preferable range | More preferable range | Further preferable range | |
| O | 0.01~0.5 | 0.02~0.4 | 0.03~0.3 | Strength improvement |
| N | 0.01~0.2 | 0.01~0.15 | 0.01~0.1 | Strength improvement |
| C | 0.01~2.0 | 0.01~1.0 | 0.01~0.5 | Strength improvement |
| Al | 0.1~8.0 | 0.2~6.0 | 0.4~5.0 | Strength improvement |
| Sn | 0.1~10.0 | 0.15~5.0 | 0.2~3.0 | Strength improvement |
| Zr | 0.5~20.0 | 0.5~10.0 | 0.5~5.0 | Strength and workability improvement |
| Mo | 0.1~25.0 | 0.2~20.0 | 0.5~15.0 | High-temperature strength and corrosion resistance improvement |
| Ta | 0.1~5.0 | 0.1~3.0 | 0.2~2.0 | Heat resistance, corrosion resistance improvement |
| V | 1.0~30.0 | 2.0~25.0 | 5.0~20.0 | Strength improvement microstructure control |
| Nb | 0.1~40.0 | 0.15~5.0 | 0.2~2.0 | Heat resistance, strength improvement |
| Si | 0.1~2.0 | 0.1~1.0 | 0.15~0.8 | Heat resistance improvement |
| Fe | 0.01~5.0 | 0.05~2.0 | 0.1~1.0 | Strength improvement, microstructure control |
| Cr | 0.1~10.0 | 0.2~5.0 | 0.2~3.0 | Strength improvement |
| Cu | 0.3~3.0 | 0.3~2.0 | 0.3~1.5 | Strength and workability improvement |
| Co | 0.05~3.0 | 0.05~2.0 | 0.1~1.0 | Corrosion resistance improvement, strength improvement |
| Ni | 0.05~2.0 | 0.1~1.0 | 0.1~0.8 | Corrosion resistance improvement, strength improvement |
| Platinum group elements such as Pt and Pd | 0.01~0.5 | 0.02~0.4 | 0.03~0.2 | Corrosion resistance improvement |
| Rare earth metals such as Sc and Y. mixed rare earth metals (misch metal) | 0.001~0.5 | 0.001~0.3 | 0.001~0.1 | Corrosion resistance improvement |
| B | 0.01~5.0 | 0.1~5.0 | 0.2~3.0 | Neutron shielding performance improvement |
| Mn | 0.1~10.0 | 0.2~8.0 | 0.2~5.0 | Strength improvement |

Further, as shown in Table 1, the titanium alloy according to the present invention may contain, for example, by mass %, one or more types of element selected from the group consisting of: O: 0.01 to 0.5%, N: 0.01 to 0.2%, C: 0.01 to 2.0%, Al: 0.1 to 8.0%, Sn: 0.1 to 10.0%, Zr: 0.5 to 20.0%, Mo: 0.1 to 25.0%, Ta: 0.1 to 5.0%, V: 1.0 to 30.0%, Nb: 0.1 to 40.0%, Si: 0.1 to 2.0%, Fe: 0.01 to 5.0%, Cr: 0.1 to 10.0%, Cu: 0.3 to 3.0%, Co: 0.05 to 3.0%, Ni: 0.05 to 2.0%, platinum group elements: 0.01 to 0.5%, rare earth elements: 0.001 to 0.5%, B: 0.01 to 5.0%, and Mn: 0.1 to 10.0%.

More preferably, the titanium alloy according to the present invention contains one or more types of element selected from the group consisting of: O: 0.02 to 0.4%, N: 0.01 to 0.15%, C: 0.01 to 1.0%, Al: 0.2 to 6.0%, Sn: 0.15 to 5.0%, Zr: 0.5 to 10.0%, Mo: 0.2 to 20.0%, Ta: 0.1 to 3.0%, Further, for example, titanium alloys specified in JIS Standards that are described hereunder can also be used.

JIS Class 11 to JIS Class 23 (JIS 4600 (2012) Titanium and titanium alloys—Sheets, plates and strips): include Pd, Ru, Ni, Co or the like, and are excellent in corrosion resistance and crevice corrosion resistance.

JIS Class 50 (JIS 4600 (2012) Titanium and titanium alloys—Sheets, plates and strips): is Ti-1.5Al, and is excellent in corrosion resistance, hydrogen absorption resistance and heat resistance.

JIS Class 60 (JIS 4600 (2012) Titanium and titanium alloys—Sheets, plates and strips): is Ti-6Al-4V, and is a high strength titanium alloy with a high degree of versatility.

JIS Class 61 (JIS 4600 (2012) Titanium and titanium alloys—Sheets, plates and strips): is Ti-3Al-2.5V, and provides favorable weldability and formability and favorable machinability.

JIS Class 80 (JIS 4600 (2012) Titanium and titanium alloys—Sheets, plates and strips): is Ti-4Al-22V, and is a high strength titanium alloy that is excellent in cold workability.

Furthermore, apart from the above described titanium alloys, a titanium alloy having a chemical composition that is not specified in JIS Standards can also be used. Examples of such titanium alloys are listed below.

Titanium alloys having heat resistance: Ti-6Al-2Sn-4Zr-2Mo-0.08Si, Ti-6Al-5Zr-0.5Mo-0.2Si, Ti-8Al-1Mo-1V, and the like.

Low-alloy, high-strength titanium alloys: Ti-1 to 1.5Fe-0.3 to 0.5O-0.01 to 0.04N and the like.

Low-alloy titanium alloys having heat resistance: Ti-1Cu, Ti-1Cu-0.5Nb, Ti-1Cu-1Sn-0.35Si-0.5Nb, and the like.

Titanium alloys excellent in creep resistance: Ti-6Al-2Sn-4Zr-6Mo and the like.

Titanium alloys having high strength and good cold workability: Ti-15V-3Cr-3Sn-3Al, Ti-20V-4Al-1Sn, and the like.

Titanium alloys having high strength and high toughness: Ti-10V-2Fe-3Al and the like.

Titanium alloys excellent in wear resistance: Ti-6Al-4V-10Cr-1.3C and the like.

Preferably, at least one near-surface portion 1a (at least a near-surface portion that contacts the external environment) contains alloying elements that express a target characteristic, with the balance being titanium and impurities. The following elements are exemplified as alloying elements that express a target characteristic, although the present invention is not limited to these elements.

(a) Alloying elements expressing corrosion resistance: by mass %, 0.01 to 0.25% of platinum group elements (Pd and/or Ru), and as required, 0.2% or less of rare earth elements, and furthermore, one or more types of element selected from Co: 0.8% or less and Ni: 0.6% or less, and the like.

(b) Alloying elements expressing oxidation resistance: one or more types of element selected from 0.1 to 0.6% of Si, 0.1 to 2.0% of Nb, 0.3 to 1.0% of Ta, and 0.3 to 1.5% of Al, and as required, one or more types of element selected from 1.5% or less of Sn, 1.5% or less of Cu, and 0.5% or less of Fe (however, in an amount of 2.5% or less in total).

(c) Alloying elements expressing fatigue resistance: one or more types of element selected from Fe, Cr, Ni, Al and Zr in a total amount of 0.08 to 1.0%.

(d) Alloying elements expressing hydrogen embrittlement resistance: one or more types of element selected from Mo, V and Nb in a range of 8.0<Mo equivalent<20.0 (where, Mo equivalent=Mo content (mass %)+V content (mass %)/1.5 Nb content (mass %)/3.6).

(e) Alloying element expressing neutron blocking properties: 0.1 to 3.0% of B.

The respective cases described in the foregoing (a) to (e) will now be individually described.

(a) Case of Containing Alloying Elements Expressing Corrosion Resistance (Chemical Composition)

In order to improve the corrosion resistance of at least one of the outer layers (at least an outer layer that contacts the external environment) of a titanium composite material produced from the titanium product for hot working of the present invention, the near-surface portion of the titanium product for hot working may contain various alloying elements that are described hereunder.

Platinum Group Elements: 0.01 to 0.25%

A platinum group element has an effect that lowers the hydrogenation voltage of a titanium alloy and maintains the spontaneous potential in an immobile zone, and can be contained as an alloying element that express corrosion resistance. The corrosion resistance will be insufficient if the content of the platinum group element (total content in a case where a plurality of platinum group elements is contained) is less than 0.01%. Even if the content is more than 0.25%, a significant improvement in corrosion resistance cannot be expected, and a content of more than 0.25% leads to a steep rise in the raw material cost. In the case of containing platinum group elements, the content thereof is made 0.01 to 0.25%. Preferably the content of platinum group elements is 0.03% or more, and more preferably is 0.05% or more. Further, a content of 0.20% or less is preferable, and more preferably is 0.15% or less.

Although the platinum group elements that may be used in the present invention are each useful elements that have an effect that increases corrosion resistance of the titanium alloy, in particular it is preferable to contain Pd for which the advantageous effect of improving corrosion resistance is high per percentage content. Further, Ru which is relatively inexpensive can be used as a substitute for Pd.

If a rare earth elements is added to a titanium alloy containing a platinum group element, the Ti and platinum group element will be rapidly eluted when exposed to a corrosive environment, and the concentration of the platinum group element in a solution in the vicinity of the titanium alloy will increase. As a result, precipitation of the platinum group element in the titanium alloy will be promoted, and the platinum group element can be efficiently precipitated even if the dissolved amount of titanium alloy is small, and this leads to an improvement in corrosion resistance.

Rare Earth Elements: 0 to 0.2%

Rare earth elements include Sc, Y, light rare earth elements (La to Eu), and heavy rare earth elements (Gd to Lu), and the above effect can be expected when any of the rare earth elements are added. The same effect can also be expected in a case where a mixture or compound of rare earth elements is used, such as a mixed rare earth elements before separation and refining (misch metal, hereinafter simply referred to as "Mm") or a didymium alloy (Nd—Pr alloy).

Taking into account the circumstances described above, it is not necessary for the rare earth elements that is added to be of only one kind, and it is considered that corrosion resistance will be improved by the above effect even if a plurality of elements are contained at the same time. In such a case, the total content of rare earth elements means the total content of the aforementioned elements.

If the content of rare earth elements is excessive, the above effect is saturated, and hence not only will a further advantageous effect of improving corrosion resistance not be obtained, but the economic efficiency will also decrease. Therefore, in the case of containing rare earth elements, the content thereof is preferably 0.2% or less and more preferably is 0.02% or less. On the other hand, in order to adequately obtain an advantageous effect of eluting Ti and platinum group elements in an active state area of the titanium alloy and to promote precipitation of the platinum group elements onto the alloy surface, it is preferable to contain 0.001% or more of rare earth elements.

Co: 0 to 0.8%
Ni: 0 to 0.6%

Co and Ni are elements that improve the corrosion resistance of the titanium alloy by changing a hydrogenation voltage, and extremely high corrosion resistance is obtained by adding Co and Ni in combination with a platinum group element and/or a rare earth elements. However, even if the Co content is more than 0.8% or the Ni content is more than 0.6%, the effect is saturated, and this is not preferable from a viewpoint of economic efficiency also. Therefore, when these elements are contained, the Co content is made 0.8% or less and the Ni content is made 0.6% or less. The Co content is preferably 0.7% or less, and the Ni content is preferably 0.5% or less. To reliably obtain the above effect, it is preferable to contain 0.05% or more of each of Co and Ni, and containing 0.2% or more of each of Co and Ni is more preferable.

The balance other than the above elements is titanium and impurities. The impurities can be contained in a range that does not inhibit the target characteristics, and other impurities include Cr, Ta, Al, V, Cr, Nb, Si, Sn, Mn, Mo, Cu, and the like as impurity elements that get mixed in mainly from scrap, and impurities are allowed as long as the amount thereof together with C, N, Fe, O and H that are the common impurity elements is 0.5% or less.

(b) Case of Containing Alloying Elements Expressing Oxidation Resistance (Chemical Composition)

The oxidation of titanium is a form of oxidation referred to as so-called "inward diffusion" that occurs when oxygen diffuses inward through the oxide film and joins with titanium at the surface. Therefore, if the diffusion of oxygen is suppressed, oxidation is suppressed. In the case of improving the oxidation resistance of a titanium alloy at a high temperature in the range of 600 to 800° C., an alloying element such as Si or Nb is added to the chemical composition of the titanium alloy. If Si is added, a silicon oxide is formed on an outer layer when exposed to a high-temperature atmosphere and thereby serves as a barrier, and hence diffusion of oxygen to the inside of the titanium is suppressed and the oxidation resistance is thus improved. Furthermore, Nb dissolves in an oxide film of the titanium, and since titanium is tetravalent, while Nb is pentavalent, the vacancy concentration of oxygen in the oxide film of the titanium falls and diffusion of oxygen in the oxide film is suppressed.

In order to improve the oxidation resistance of at least one of the outer layers (at least an outer layer that contacts the external environment) of a titanium composite material produced from the titanium product for hot working of the present invention, the near-surface portion of the titanium product for hot working may contain various alloying elements that are described hereunder.

Si: 0.1 to 0.6%

Si has an action that improves oxidation resistance at a high temperature of 600 to 800° C. If the Si content is less than 0.1%, the degree of improvement in oxidation resistance will be small. On the other hand, if the Si content is more than 0.6%, the influence on oxidation resistance will be saturated and workability will noticeably decline not only at room temperature but also at a high temperature. Hence, in a case where Si is to be contained, the content thereof is made 0.1 to 0.6%. An Si content of 0.15% or more is preferable, and an Si content of 0.20% or more is more preferable. Further, the Si content is preferably 0.55% or less, and more preferably is 0.50% or less.

Nb: 0.1 to 2.0%

Nb also has an action that improves oxidation resistance at a high temperature. In order to improve oxidation resistance, the Nb content is made 0.1% or more. On the other hand, even if the Nb content contained in the titanium alloy is more than 2.0%, the effect will be saturated, and this will also cause an increase in the alloy cost since Nb is an expensive additional element. Hence, in a case where Nb is to be contained, the content thereof is made 0.1 to 2.0%. The Nb content is preferably 0.3% or more, and more preferably is 0.5% or more. Further, the Nb content is preferably 1.5% or less, and more preferably is 1.0% or less.

Ta: 0.3 to 1.0%

Ta also has an action that improves oxidation resistance at a high temperature. In order to improve oxidation resistance, the Ta content is made 0.3% or more. On the other hand, if the Ta content contained in the titanium alloy is more than 1.0%, not only will this cause an increase in the alloy cost since Ta is an expensive additional element, but formation of β phase by a heat treatment temperature is also a concern. Hence, in a case where Ta is to be contained, the content thereof is made 0.3 to 1.0%. The Ta content is preferably 0.4% or more, and more preferably is 0.5% or more. Further, the Ta content is preferably 0.9% or less, and more preferably is 0.8% or less.

Al: 0.3 to 1.5%

Al is also an element that improves oxidation resistance at a high temperature. On the other hand, if Al is contained in a large amount, ductility at room temperature noticeably decreases. An oxidation resistance property is sufficiently expressed if the Al content is 0.3% or more. Further, if the Al content is 1.5% or less, working performed as cold processing can be sufficiently ensured. Hence, in a case where Al is to be contained, the content thereof is made 0.3 to 1.5%. The Al content is preferably 0.4% or more, and more preferably is 0.5% or more. Further, the Al content is preferably 1.2% or less.

Note that, although oxidation resistance is improved if any one of Si, Nb, Ta and Al is individually contained, high temperature oxidation resistance can be further improved by containing a combination of these elements.

In addition to the above elements, one or more types of element selected from Sn, Cu and Fe may be contained.

Sn: 0 to 1.5%

Sn is an α phase stabilizing element, and similarly to Cu, is an element that increases high temperature strength. However, if the Sn content is more than 1.5%, the Sn inhibits twinning deformation and reduces workability at room temperature. Therefore, in a case where Sn is to be contained, the content thereof is made 1.5% or less. The Sn content is preferably 1.3% or less, and more preferably is 1.2% or less. When it is desired to obtain the aforementioned effect, the Sn content is preferably 0.2% or more, and more preferably is 0.5% or more.

Cu: 0 to 1.5%

Cu is an element that increases high temperature strength. Further, since Cu dissolves to a fixed degree in α phase, Cu does not form β phase even when used at a high temperature. However, if the Cu content is more than 1.5%, the Cu may form β phase depending on the temperature. Therefore, in a case where Cu is to be contained, the content thereof is made 1.5% or less. The Cu content is preferably 1.4% or less, and more preferably is 1.2% or less. When it is desired to obtain the aforementioned effect, the Cu content is preferably 0.2% or more, and more preferably is 0.4% or more.

Fe: 0 to 0.5%

Although Fe is a β phase stabilizing element, if Fe is contained in a small amount, there is little formation of β phase, and the Fe will not significantly affect oxidation resistance. However, if the Fe content is more than 0.5%, the formed amount of β phase is large, causing oxidation resistance to deteriorate. Therefore, in a case where Fe is to be contained, the content thereof is made 0.5% or less. Preferably the Fe content is 0.4% or less, and more preferably is 0.3% or less.

If the total content of Sn, Cu and Fe is more than 2.5%, these elements will decrease the workability at room temperature, and depending on the temperature, β phase may be formed. Therefore, in a case where one or more types of element selected from Sn, Cu and Fe is to be contained, preferably the total content thereof is not more than 2.5%.

The balance other than the above elements is titanium and impurities. The impurities can be contained in a range that does not inhibit the target characteristics, and other impurities include Cr, V, Mn, Mo, and the like as impurity elements that get mixed in mainly from scrap, and impurities are allowed as long as the amount thereof together with C, N, O and H that are the common impurity elements is 5.0% or less.

(c) Case of Containing Alloying Elements Expressing Fatigue Resistance (Chemical Composition)

In order to improve the fatigue resistance of at least one of the outer layers (at least an outer layer that contacts the external environment) of a titanium composite material produced from the titanium product for hot working of the present invention, the near-surface portion of the titanium product for hot working may contain various alloying elements that are described hereunder.

One or more types of element selected from Fe, Cr, Ni, Al and Zr: 0.08 to 1.0%

Because the origin of fatigue fracture is the surface of a sheet, it is preferable to make the α-phase grain size 15 μm or less to obtain high fatigue resistance while maintaining formability. The α-phase grain size is more preferably made 10 μm or less, and further preferably is made 5 μm or less.

In order to make the α-phase grain size 15 μm or less and obtain high fatigue resistance, the total content of Fe, Cr, Ni, Al and Zr is made 0.08% or more. On the other hand, if the total content of these elements is more than 1.0%, in some cases the ductility such as elongation and formability significantly decreases. Therefore, the total content of one or more types of element selected from Fe, Cr, Ni, Al and Zr is made 0.08 to 1.0%.

The balance other than the above elements is titanium and impurities. The impurities can be contained in a range that does not inhibit the target characteristics, and other impurities include Sn, Mo, V, Mn, Nb, Si, Cu, Co, Pd, Ru, Ta, Y, La, Ce, and the like as impurity elements that get mixed in mainly from scrap, and impurities are allowed as long as the amount thereof together with C, N, O and H that are the common impurity elements is 5.0% or less.

(d) Case of Containing Alloying Elements Expressing Hydrogen Embrittlement Resistance (Chemical Composition)

In order to improve the hydrogen absorption resistance of at least one of the outer layers (at least an outer layer that contacts the external environment) of a titanium composite material produced from the titanium product for hot working of the present invention, the near-surface portion of the titanium product for hot working may contain various alloying elements that are described hereunder.

$8.0 < \text{Mo equivalent} < 20.0$

Where, Mo equivalent=Mo content (mass %)+V content (mass %)/1.5+Nb content (mass %)/3.6.

A layer that obtains hydrogen absorption resistance is a titanium alloy layer containing β stabilizing elements in a fixed range. The reason for defining formation of the β phase is that, while the α phase of titanium forms hydrides with even a very small hydrogen concentration of several 10 ppm, the β phase of a titanium alloy can dissolve hydrogen of approximately 1000 ppm or more, and hence has a characteristic such that it is difficult for embrittlement that is caused by hydrogen to occur.

In a case where eutectoid β stabilizing elements such as Fe and Cr are contained, there is a risk of titanium and these elements forming a compound and causing embrittlement. However, in a case where, among the β stabilizing elements, Mo, V and Nb are contained within a range that satisfies "$8.0 < \text{Mo equivalent} < 20.0$", even if Fe and Cr or the like are simultaneously present, embrittlement does not occur because the β phase is stable and does not form a compound phase.

Here, the lower limit of the Mo equivalent is an alloy amount required to obtain a sufficient amount of β phase. The upper limit is set based on the fact that a titanium alloy in which the amount of added alloying elements is large is not suitable for use from a cost aspect since the price thereof is high.

The balance other than the above elements is titanium and impurities. Impurities can be contained in a range that does not inhibit the target characteristics, and other impurities include Ta, Si, Mn, Cu, and the like as impurity elements that get mixed in mainly from scrap, and the impurities are allowed as long as the amount thereof together with C, N, Fe, O and H that are the common impurity elements is 5% or less.

(e) Case of Containing Alloying Elements Expressing Neutron Blocking Properties (Chemical Composition)

In order to provide a neutron shielding effect in at least one of the outer layers (at least an outer layer that contacts the external environment) of a titanium composite material produced from the titanium product for hot working of the present invention, the near-surface portion of the titanium product for hot working may contain various alloying elements that are described hereunder.

B: 0.1 to 3.0%

The natural abundance of $^{10}$B in B is 19.9%, and $^{10}$B has a large absorption cross section for thermal neutrons and a neutron shielding effect thereof is large. A neutron shielding effect is not adequately obtained if the B content is less than 0.1%, and if the B content is more than 3.0% there is a risk of causing cracks and a deterioration in workability during hot rolling.

In this case, it is possible to manufacture a titanium alloy containing B by adding B or a boride such as $TiB_2$ to titanium. Furthermore, if material containing $^{10}$B enriched boron ($^{10}$B content is approximately 90% or more) such as $H_3^{10}BO_3$, $^{10}B_2O$ or $^{10}B_4C$ is used, since the neutron shielding effect is large even if the B content is small, the titanium alloy is extremely useful.

In the case of using $H_3^{10}BO_3$, $^{10}B_2O$ or $^{10}B_4C$, although H and O also concentrate in the alloy layer, the H does not constitute a problem since the H comes out from the material during a heat treatment such as vacuum annealing, and with respect to O and C, if the content of O is 0.4 percent by mass or less and the content of C is 0.1 percent by mass or less which are not more than the respective upper limits contained in a commercially pure titanium, production can be performed without a problem.

The balance other than the above elements is titanium and impurities. The impurities can be contained in a range that does not inhibit the target characteristics, and other impurities include Cr, Ta, Al, V, Cr, Nb, Si, Sn, Mn, Mo, Cu and the like as impurity elements that get mixed in mainly from scrap, and impurities are allowed as long as the amount thereof together with C, N, Fe, O and H that are the common impurity elements is 5% or less.

Note that, when producing the titanium materials for hot rolling 1 and 2 according to the present invention, the titanium cast piece 3 serving as the material may be basically obtained by an arbitrary melting method and an arbitrary casting method. The titanium cast piece 3 that can exert the effect of the present invention most effectively is a rectangular titanium east piece obtained by melting a raw material such as titanium sponge or titanium scrap by the electron beam remelting method or the plasma arc melting method under vacuum and casting the molten titanium by the DC slab casting method under vacuum into a rectangular shape with a long rectangular cross section (a slab shape).

According to the DC slab casting method, a rectangular titanium cast piece having a rectangular cross section of a form and dimensions which are suited to hot rolling can be readily obtained, and therefore a breakdown process performed as hot processing such as slabbing or forging can be omitted.

The dimensions of the titanium materials for hot rolling 1 and 2 are not particularly limited as long as the titanium material has dimensions such that the titanium material can be subjected to hot rolling as it is. When coil rolling is applied as the hot rolling to produce a hot-rolled, coiled thin intermediate sheet with a sheet thickness of 3 mm to 8 mm, the dimensions of the titanium materials for hot rolling 1 and 2 may be set to a thickness of approximately 150 mm to 280 mm, a length of approximately 3 m to 10 m, and a width of approximately 600 mm to 1500 mm.

Further, in billets, blooms and the like which are to be subjected to hot rolling, similar effects are expressed by welding titanium sheets to portions corresponding to rolling surfaces thereof and performing hot rolling. Therefore, a titanium cast piece constituting the titanium materials for hot rolling 1 and 2 according to the present invention is not limited to a rectangular shape (a slab shape), and also includes a billet and a bloom.

As illustrated in FIGS. 1 and 2, with respect to the welding that affixes the titanium sheets 4 and 4 to the titanium cast piece 3, to ensure that air does not enter between the titanium cast piece 3 and the titanium sheets 4 and 4 after welding, preferably the outer circumferential portion of each of the titanium sheets 4 and 4 is welded to the titanium cast piece 3, and more preferably not only the outer circumferential portion but also a central portion of each of the titanium sheets 4 and 4 is welded to the titanium cast piece 3. By this means, a non-weld zone, which is other than a weld zone between the cast piece 3 and the titanium sheets 4 and 4, is also compressively bonded during hot rolling. Therefore, in a subsequent process, it is not necessary to perform picking by, for example, pickling, with respect to a region corresponding to the titanium sheets 4 and 4 in a titanium member that underwent the hot rolling due to the titanium sheets 4 and 4 peeling off from the titanium cast piece 3 during hot rolling.

When affixing the titanium sheets 4 and 4 to the titanium cast piece 3 by welding, the welding is preferably performed in vacuum. By performing the welding in vacuum, the interior of a non-weld zone, which is other than a weld zone between the titanium cast piece 3 and the titanium sheets 4 and 4, can be sealed in a vacuum state.

When affixing the titanium sheets 4 and 4 to the titanium cast piece 3 by welding, the welding may be performed in an inert gas atmosphere. In this case, close attention is required since there is also a concern that the titanium sheets 4 and 4 will peel off from the titanium cast piece during hot rolling due to inert gas being trapped between the titanium cast piece 3 and the titanium sheets 4 and 4, and the titanium cast piece 3 and the titanium sheets 4 and 4 not being compressively bonded sufficiently even though hot rolling is performed.

Note that, in the present invention, it is sufficient that the titanium cast piece 3 and the titanium sheets 4 and 4 are compressively bonded during hot rolling, and from this viewpoint it is not necessary to place the inside of a non-weld zone, which is other than a weld zone between the titanium cast piece 3 and the titanium sheets 4 and 4, into an ultra-high vacuum state. As long as the vacuum degree in the case of melting in vacuum is higher than $3 \times 10^{-3}$ Torr, the titanium cast piece 3 and the titanium sheets 4 and 4 can be adequately adhered to each other during hot rolling, and hence a vacuum degree of $3 \times 10^{-3}$ Torr or more is preferable.

Note that, if the titanium sheets 4 and 4 are welded to the titanium cast piece 3, for example, under atmospheric pressure, in some cases the titanium cast piece 3 and the titanium sheets 4 and 4 will not be adequately adhered to each other. In such a case, it is sufficient to perform picking with respect to a portion corresponding to the titanium sheets 4 and 4 in the titanium product by, for example, pickling after hot rolling, and by this means also surface defects of the titanium product that are caused by the influence of deformation anisotropy that is attributable to an as-cast, coarse solidified microstructure of the titanium cast piece 3 can be reduced, and surface properties equivalent to surface properties obtained in a case where a slabbing process is also performed can be obtained.

Further, as illustrated in FIG. 2, similarly to the rolling surfaces 3a and 3a of the titanium cast piece 3, titanium sheets 5 and 5 having the same chemical composition as the titanium cast piece 3 may be attached and welded to the side faces 3b and 3b of the titanium cast piece (rectangular slab) 3 which serve as edge sides when performing hot rolling.

That is, during hot rolling, normally the titanium materials for hot rolling 1 and 2 are subjected to a rolling reduction, whereby at least a part of the faces on the edge sides of the titanium materials for hot rolling 1 and 2 goes around to a flat surface side of the titanium product (hot-rolled product). Consequently, if the outer layer of the side faces 3b and 3b of the titanium materials for hot rolling 1 and 2 is coarse or many defects are present in the outer layer, there is a possibility that surface defects will arise close to both ends in the sheet width direction of the titanium product (hot-rolled sheet).

Therefore, the occurrence of the above situation can be effectively prevented by also attaching and welding the titanium sheets 5 and 5 having the same chemical composition as the titanium cast piece 3 to the side faces 3b and 3b of the titanium cast piece (rectangular slab) 3, similarly to the rolling surfaces 3a and 3a of the titanium cast piece 3.

With respect to the area in which to attach and weld the titanium sheets 5 and 5 on the side faces 3b and 3b of the titanium cast piece (rectangular slab) 3, at least an area of, for example, 20 to 30 mm in the slab thickness direction from a corner portion 3c that is formed by the rolling surface 3a and the side face 3b of the titanium cast piece 3 may be mentioned as an example.

Preferably, the thickness of the titanium sheets 4 and 5 to be welded is between 1 and 20 mm. If the thickness of the titanium sheets 4 and 5 to be welded is too thin, there is a risk that the titanium sheets 4 and 5 will break when performing hot rolling and a coarse cast microstructure of the titanium cast piece 3 will be exposed at the surface, and consequently the surface properties of the titanium product will deteriorate. Further, as described above, in the case of welding the titanium sheets 4 and 5 and the titanium cast piece 3 in vacuum, if the titanium sheets 4 and 5 become unstuck from the titanium cast piece 3 before being compressively bonded, there is a risk that atmospheric air will enter between the titanium cast piece 3 and the titanium sheets 4 and 5, and the surface of the titanium cast piece 3 will oxidize during the heating before hot rolling, and the titanium cast piece 3 arid the titanium sheets 4 and 5 will not be compressively bonded by the hot rolling and will instead peel off during the hot rolling. If the thickness of the titanium sheets 4 and 5 is 1 mm or more, the titanium sheets 4 and 5 will not break during hot rolling. Accordingly, the thickness of the titanium sheets 4 and 5 is preferably 1 mm or more.

On the other hand, if the thickness of the titanium sheets 4 and 5 is too thick, because the heat input during welding will be too large, there is a risk that grains of the titanium sheets 4 and 5 will coarsen in a weld heat-affected zone and the surface properties of the titanium product will deteriorate. If the thickness of the titanium sheets 4 and 5 is 20 mm or less, coarsening of grains of the titanium sheets 4 and 5 during welding will not be significant. Therefore, it is preferable to make the thickness of the titanium sheets 4 and 5 not more than 20 mm.

Further, preferably the grain sizes in the titanium sheets 4 and 5 are less than 1 mm. If the grain sizes in the titanium sheets 4 and 5 are coarse, even if the titanium sheets 4 and 5 are attached by welding to the titanium cast piece 3 and hot rolling of the titanium materials for hot rolling 1 and 2 is performed, surface defects that are attributable to the characteristic strong plastic anisotropy of titanium will occur and the surface properties of the titanium product will not improve. If the grain sizes in the titanium sheets 4 and 5 are less than 1 mm, the surface properties of the titanium product will not deteriorate. Therefore, the grain sizes in the titanium sheets 4 and 5 are preferably less than 1 mm.

Note that, since the surface properties of the titanium product will not deteriorate if the grain sizes in the titanium sheets 4 and 5 are fine, although a lower limit is not particularly provided, the lower limit of the grain size in the titanium sheets 4 and 5 that are industrially producible is approximately 5 μm in the case of commercially pure titanium. Further, in the case of a titanium alloy, in some cases an acicular microstructure is formed due to rapid cooling or the like, and in such a case a diameter equivalent to a value obtained by circle conversion by the area method is taken as the grain size, and since an effect that suppresses the occurrence of surface defects is expressed if the diameter is less than 1 mm, the circle-equivalent diameter is taken as the grain size.

The titanium cast piece 3 is preferably a titanium cast piece produced by electron beam remelting or plasma arc melting. The titanium cast piece 3 may be either of a titanium cast piece having an as-cast casting skin of a cast piece which can be directly subjected to hot rolling and a titanium cast piece from which the casting skin was removed by cold finishing that are obtained by a melting method such as electron beam remelting.

Such a rectangular titanium cast piece is obtained without undergoing a breakdown process composed of slabbing or forging, and the electron beam remelting method, the plasma arc melting method or the like can be applied as the melting method. In particular, in the electron beam remelting method, since melting is carried out in high vacuum, the inside of voids remaining in the vicinity of the slab surface remain in vacuum after melting, and therefore there is the advantage that the voids can be compressively bonded during hot rolling and therefore the voids are easily rendered harmless.

As described above, the titanium sheets 4 and 5 may be welded to the surface of the titanium cast piece 3 after performing normal cast piece surface trim by cutting or the like, that is, performing cold finishing, or may be welded directly to the casting skin of the as-east titanium cast piece 3 without performing trim.

By welding the titanium sheets 4 and 5 to the casting skin of the as-cast titanium cast piece 3 directly without performing surface trim, casting skin defects such as cracks that occur during casting can be covered over by the titanium sheets 4 and 5. In addition, by welding while maintaining the space between the cast piece 3 and the titanium sheets 4 and 5 in a vacuum state, casting skin defects such as cracks can also be compressively bonded during hot rolling and thereby eliminated. Therefore, omitting a finishing process performed by cutting of a near-surface portion of the cast piece 3 or the like is expected to achieve a further reduction in cost as the result of the omission of the process and an improvement in the yield.

However, in a case where a comparatively large casting skin defect that cannot be expected to be compressively bonded during hot rolling exists in the titanium cast piece 3, after partially trimming the surface of the titanium cast piece 3, a melting and resolidification process may be performed. If a melting and resolidification process is performed after the entire surface is trimmed, because the surface of the titanium cast piece 3 is even, it is expected that compressive bonding of the titanium cast piece 3 with the titanium sheets 4 and 5 during hot rolling will be facilitated, and more stable production will be achieved.

EXAMPLE 1

Hereunder, the present invention is described in further detail by way of Examples 1 to 3.

In the Conventional Example, Inventive Examples of the present invention and Comparative Examples shown in Nos. 1 to 16 in Table 2, the titanium cast pieces 3 illustrated in FIGS. 1 and 2 were produced by melting any one of Classes 1 to 4 of commercially pure titanium by the electron beam remelting method, and casting the molten titanium using a rectangular mold.

TABLE 2

| No. | Material | Product | Slabbing | Cutting Trim of Ingot | Welding Method | Thickness of Welded Sheet (mm) | Grain Size of Titanium Sheet | Surface Defects | Evaluation | Remarks |
|---|---|---|---|---|---|---|---|---|---|---|
| 1 | Pure Titanium Class 1 | Sheet | Yes | Yes | Electron Beam | — | — | Minor | ○ | Conventional Example |
| 2 | Pure Titanium Class 1 | Sheet | No | Yes | Electron Beam | — | — | Coarse Defects | x | Comparative Example |
| 3 | Pure Titanium Class 1 | Sheet | No | Yes | Electron Beam | 3 | 3 mm | High Defect Frequency | x | Comparative Example |
| 4 | Pure Titanium Class 1 | Sheet | No | Yes | Electron Beam | 0.5 | 50 μm | Partial Sheet Breakage, Coarse Defects | x | Comparative Example |
| 5 | Pure Titanium Class 1 | Sheet | No | Yes | Electron Beam | 1.5 | 35 μm | Minor | ○ | Inventive Example of Present Invention |
| 6 | Pure Titanium Class 1 | Sheet | No | Yes | Electron Beam | 2 | 100 μm | Minor | ○ | Inventive Example of Present Invention |
| 7 | Pure Titanium Class 1 | Sheet | No | Yes | Plasma | 4 | 500 μm | Minor | ○ | Inventive Example of Present Invention |
| 8 | Pure Titanium Class 1 | Sheet | No | No | Plasma | 4.5 | 50 μm | Minor | ○ | Inventive Example of Present Invention |
| 9 | Pure Titanium Class 1 | Sheet | No | No | Electron Beam | 12 | 100 μm | Minor | ○ | Inventive Example of Present Invention |
| 10 | Pure Titanium Class 1 | Sheet | No | No | Electron Beam | 5.5 | 70 μm | Minor | ○ | Inventive Example of Present Invention |
| 11 | Pure Titanium Class 2 | Sheet | No | No | Electron Beam | 4.5 | 400 μm | Minor | ○ | Inventive Example of Present Invention |
| 12 | Pure Titanium Class 2 | Sheet | No | No | Electron Beam | 6.1 | 700 μm | Minor | ○ | Inventive Example of Present Invention |
| 13 | Pure Titanium Class 3 | Sheet | No | No | Electron Beam | 5.1 | 30 μm | Minor | ○ | Inventive Example of Present Invention |
| 14 | Pure Titanium Class 4 | Sheet | No | No | Electron Beam | 5.1 | 40 μm | Minor | ○ | Inventive Example of Present Invention |
| 15 | Pure Titanium Class 2 | Sheet | No | No | Electron Beam | 25 | 150 μm | High defect frequency near location corresponding to weld zone | x | Comparative Example |
| 16 | Pure Titanium Class 2 | Sheet | No | Yes | TIG | 6.0 | 100 μm | Although defects were seen to a certain extent, the size and frequency of defects were small compared to No. 2. | Δ | Inventive Example of Present Invention |

Thereafter, in a case which included cutting trim of the casting skin of the titanium cast piece 3, welding for affixing the titanium sheets 4 and 5 was performed after the outer layer of the titanium cast piece 3 was trimmed by cutting, and in a case which did not include cutting trim, welding for affixing the titanium sheets 4 and 5 was performed without performing trim of the outer layer by cutting. In particular, in the Inventive Examples of the present invention of Nos. 5 and 11, the titanium sheets 5 and 5 were also affixed by welding to the side faces of the titanium cast pieces 3 and 3.

In the Inventive Examples of the present invention and Comparative Examples of Nos. 2 to 6 and No. 16, after the titanium cast piece 3 was produced, the casting skin was cut and removed, and thereafter affixing of the titanium sheets 4 and 5 by welding was performed. Further, in the Inventive Examples of the present invention and Comparative Example of Nos. 7 to 15, after the titanium cast piece 3 was produced, affixing of the titanium sheets 4 and 5 to the casting skin by welding was performed.

In the Inventive Examples of the present invention and the Comparative Examples shown in Nos. 2 to 6 and 9 to 15 in Table 2, attachment of the titanium sheets 4 and 5 to the titanium cast piece 3 by welding was performed using an electron beam. At such time, an electron beam welding apparatus having a defined output of 30 kW was used. Further, attachment of the titanium sheets 4 to the titanium east piece 3 by welding in the Inventive Examples shown in Nos. 7 and 8 was performed by plasma arc welding. Furthermore, attachment of the titanium sheets 4 to the titanium cast piece 3 by welding in the Inventive Example shown in No. 16 was performed by tungsten inert gas welding.

Further, at 10 arbitrary locations on the titanium sheet 4, the grain sizes were measured by cross-sectional microstructure observation, and the average value of the grain sizes was determined as the grain size of the titanium sheet 4. The measurement results are shown in Table 1.

The titanium materials for hot rolling 1 and 2 (thickness of 250 mm×width of 1000 mm×overall length of 7000 mm) produced in this manner were subjected to hot rolling using hot rolling facilities of iron and steel material to produce titanium sheets in band-shaped coils having a thickness of 4 mm.

Surface defects of these titanium sheets were evaluated. Evaluation of the surface defects was performed by visually observing an outer layer of the titanium sheet after pickling.

The Conventional Example of No. 1 is a case where a titanium sheet was produced following a conventional slabbing process using a commercially pure titanium ingot. Because the titanium sheet underwent a slabbing process, surface defects on the produced titanium sheet were minor.

The Comparative Example of No. 2 is a case where the titanium cast piece 3 composed of commercially pure titanium was used, a slabbing process was omitted, and hot rolling was performed without attaching the titanium sheets 4. Coarse surface defects were observed on the titanium sheet that underwent pickling after hot rolling.

In the Comparative Example of No. 3, although the thickness of the titanium sheets 4 that are attached to the titanium cast piece 3 by welding was a sufficiently thick thickness of 3 mm, the grain size was an extremely coarse size of 3 mm. Therefore, a large number of surface defects were observed on the titanium sheet.

In the Comparative Example of No. 4, although the grain size of the titanium sheets 4 that are attached to the titanium cast piece 3 by welding was a sufficiently fine diameter of 50 μm, the thickness of the titanium sheet 4 was an extremely thin thickness of 0.5 mm. Consequently, one portion peeled off during hot rolling, and coarse surface defects were observed in the titanium sheet at that portion.

In the Inventive Example of the present invention of No. 5, the surfaces of the titanium cast piece 3 were subjected to cutting, and thereafter the titanium sheets 4 and 5 are attached. The thickness of the titanium sheets 4 and 5 that are attached by welding was a sufficiently thick thickness of 1.5 mm, and the grain size of the titanium sheets 4 and 5 was also a sufficiently fine diameter of 35 μm, and hence surface defects on the titanium sheet were minor and were of an equal level to the Conventional Example of No. 1. Further, because the titanium sheets 5 were also welded to the side faces 3b of the titanium cast piece 3, surface properties in the vicinity of the edge portions of the titanium sheet were also good.

In the Inventive Example of the present invention of No. 6, the surfaces 3a of the titanium cast piece 3 were subjected to cutting, and thereafter the titanium sheets 4 are attached. The thickness of the titanium sheets 4 that are attached by welding was a sufficiently thick thickness of 2 mm, and the grain size of the titanium sheets 4 was also a sufficiently fine diameter of 100 μm, and hence surface defects on the titanium sheets were minor and were of an equal level to the Conventional Example of No. 1.

In the Inventive Example of the present invention of No. 7, the surfaces 3a of the titanium cast piece 3 was subjected to cutting, and thereafter the titanium sheets 4 are attached by plasma welding. The thickness of the titanium sheets 4 that are attached by welding was a sufficiently thick thickness of 4 mm, and the grain size of the titanium sheets 4 was also a sufficiently fine diameter of 500 μm, and hence surface defects on the titanium sheets were minor and were of an equal level to the Conventional Example of No. 1.

In the Inventive Example of the present invention of No. 8, the surfaces 3a of the titanium cast piece 3 was subjected to cutting, and thereafter the titanium sheets 4 are attached by plasma welding. The thickness of the titanium sheets 4 that are attached by welding was a sufficiently thick thickness of 4.5 mm, and furthermore the grain size of the titanium sheets 4 was also a sufficiently fine diameter of 50 μm, and hence surface defects on the titanium sheet were minor and were of an equal level to the Conventional Example of No. 1.

In each of the Inventive Examples of the present invention of Nos. 9 to 14, the titanium sheets 4 and 5 are attached without cutting the surfaces 3a of the titanium cast piece 3. The thickness of the titanium sheets 4 and 5 that are attached by welding was a sufficiently thick thickness of 4.5 to 6.1 mm, and the grain size of the sheets was also a sufficiently fine diameter of 30 to 700 μm, and hence surface defects on the titanium sheet were minor and were of an equal level to the Conventional Example of No. 1.

In the Comparative Example of No. 15, although the grain size of the titanium sheets 4 that are attached to the titanium cast piece 3 by welding was a sufficiently fine diameter of 50 μm, the titanium sheet 4 had an extremely thick thickness of 25 mm. Consequently, the heat input of the weld zone was large, and defects occurred at a high frequency in the vicinity of positions corresponding to a weld zone.

Further, Inventive Example of the present invention of No. 16 is a case where the titanium sheets 4 are welded to the titanium cast piece 3 under atmospheric pressure. Although the titanium cast piece 3 and the titanium sheets 4 did not adequately adhere to each other during hot rolling, by subjecting portions corresponding to the titanium sheets 4 on the titanium product to picking by, for example, pickling after hot rolling, although the surface defects of the titanium sheet were inferior to the surface defects of the Conventional Example of No. 1, the defects were minor in comparison to the Comparative Example shown in No. 2 for which attachment of sheets was not performed.

EXAMPLE 2

For Inventive Examples of the present invention shown in Nos. 17 to 19 in Table 3, melting of the titanium cast piece 3 (slab) was performed by the plasma arc melting method, and casting was performed using a rectangular mold. Thereafter, in a case which included cutting trim of the casting skin of the titanium cast piece 3, trim of the outer layer was performed by cutting and thereafter welding was performed for affixing the titanium sheets 4, and in a case which did not include cutting trim, welding was performed for affixing the titanium sheets 4 without performing trim of the outer layer by cutting.

In the Inventive Examples of the present invention of Nos. 17 to 19 in Table 3, attachment of the titanium sheets 4 to the titanium cast piece 3 by welding was performed entirely by means of an electron beam. At such time, an electron beam welding apparatus having a defined output of 30 kW was used.

Further, at 10 arbitrary locations on the titanium sheet 4, the grain sizes were measured by cross-sectional microstructure observation, and the average value of the grain sizes was determined as the grain size of the titanium sheet 4. The measurement results are shown in Table 3.

The respective titanium materials for hot rolling 1 (thickness of 250 mm×width of 1000 mm×overall length of 5000 mm) produced in this manner were subjected to hot rolling using hot rolling facilities of iron and steel material to produce titanium sheets in band-shaped coils having a thickness of 4 mm.

Surface defects of these titanium sheets were evaluated in a similar manner as in Example 1.

pieces 3 was performed by the electron beam remelting method, and casting was performed using a rectangular mold.

In Table 4, No. 20 is a titanium alloy composed of Ti-0.06Pd, No. 21 is a titanium alloy composed of Ti-0.5Ni-0.05Ru, No. 22 is a titanium alloy composed of Ti-1.0Fe-0.35O, No. 23 is a titanium alloy composed of Ti-1.5Fe-0.5O, No. 24 is a titanium alloy composed of Ti-3Al-2.5V, No. 25 is a titanium alloy composed of Ti-5Al-1Fe, No. 26 is a titanium alloy composed of Ti-6Al-4V, No. 27 is a titanium alloy composed of Ti-0.25Fe-0.45Si, No. 28 is a titanium alloy composed of Ti-0.9Al-0.45Si-0.25Nb, No. 29 is a titanium alloy composed of Ti-4.5Al-2Fe-2Mo-3V, No. 30 is a titanium alloy composed of Ti-20V-4Al-1Sn, and No. 31 is a titanium alloy composed of Ti-15V-3Cr-3Al-3Sn.

Further, in the Inventive Examples of the present invention of Nos. 32 to 34, melting of the titanium slab was performed by the plasma arc melting method, and casting was performed using a rectangular mold.

TABLE 3

| No. | Material | Product | Slabbing | Cutting Trim of Ingot | Welding Method | Thickness of Welded Sheet (mm) | Grain Size of Titanium Sheet | Surface Defects | Evaluation | Remarks |
| --- | --- | --- | --- | --- | --- | --- | --- | --- | --- | --- |
| 17 | Pure Titanium Class 1 | Sheet | No | Yes | Electron Beam | 6.5 | 80 μm | Minor | ○ | Inventive Example of Present Invention |
| 18 | Pure Titanium Class 1 | Sheet | No | No | Electron Beam | 4.5 | 100 μm | Minor | ○ | Inventive Example of Present Invention |
| 19 | Pure Titanium Class 2 | Sheet | No | No | Electron Beam | 3.8 | 75 μm | Minor | ○ | Inventive Example of Present Invention |

In the Inventive Example of the present invention of No. 17, the surfaces of the titanium cast piece 3 were subjected to cutting, and thereafter the titanium sheets 4 are attached. The thickness of the titanium sheets 4 that are attached by welding was a sufficiently thick thickness of 6.5 mm, and the grain size of the titanium sheets 4 was also a sufficiently fine diameter of 80 μm, and hence surface defects on the titanium sheet were minor and were of an equal level to a case in which a slabbing process is performed.

In the Inventive Examples of the present invention of Nos. 18 and 19, titanium sheets are attached without cutting the surfaces of the titanium slabs. The thickness of the sheets that are attached by welding was a sufficiently thick thickness of 1 mm or more, and the grain size of the sheets was also a sufficiently fine diameter of less than 1 mm, and hence the surface defects were minor and were of an equal level to the Conventional Example of No. 1 in Table 2.

EXAMPLE 3

In the Inventive Examples of the present invention of Nos. 20 to 31 in Table 4, melting of the respective titanium cast In Table 4, No. 32 is a titanium alloy composed of Ti-1.0Cu, No. 33 is a titanium alloy composed of Ti-1.0Cu-0.5Nb, and No. 34 is a titanium alloy composed of Ti-1.0Cu-1.0Sn-0.45Si-0.2Nb.

After casting the titanium cast piece 3, in a case which included cutting trim of the casting skin of the titanium cast piece 3, trim of the outer layer was performed by cutting and thereafter welding was performed for affixing the titanium sheets 4, and in a case which did not include cutting trim, welding was performed for affixing the titanium sheets 4 without performing trim of the outer layer by cutting.

Further, at 10 arbitrary locations on the titanium sheet 4, the grain sizes were measured by cross-sectional microstructure observation, and the average value of the grain sizes was determined as the grain size of the titanium sheet 4. The measurement results are shown in Table 3.

The respective titanium materials for hot rolling 1 (thickness of 250 mm×width of 1000 mm×overall length of 5000 mm) produced in this manner were subjected to hot rolling using hot rolling facilities of iron and steel material to produce titanium sheets in band-shaped coils having a thickness of 4 mm.

Surface defects of these titanium sheets were evaluated in a similar manner as in Example 1.

TABLE 4

| No. | Material | Product | Slabbing | Cutting Repair of Ingot | Welding Method | Thickness of Welded Sheet (mm) | Grain Size of Titanium Sheet | Surface Defects | Evaluation | Remarks |
|---|---|---|---|---|---|---|---|---|---|---|
| 20 | Ti—0.06Pd | Sheet | Yes | No | Electron Beam | 6.5 | 100 μm | Minor | ○ | Inventive Example of Present Invention |
| 21 | Ti—0.5Ni—0.05Ru | Sheet | No | No | Electron Beam | 4.5 | 35 μm | Minor | ○ | Inventive Example of Present Invention |
| 22 | Ti—1.0Fe—0.35O | Sheet | No | Yes | Electron Beam | 3.8 | 15 μm | Minor | ○ | Inventive Example of Present Invention |
| 23 | Ti—1.5Fe—0.5O | Sheet | No | No | Electron Beam | 5.1 | 15 μm | Minor | ○ | Inventive Example of Present Invention |
| 24 | Ti—3Al—2.5V | Sheet | No | No | Electron Beam | 4.5 | 5 μm | Minor | ○ | Inventive Example of Present Invention |
| 25 | Ti—5Al—1Fe | Sheet | No | Yes | Electron Beam | 4.3 | 5 μm | Minor | ○ | Inventive Example of Present Invention |
| 26 | Ti—6Al—4V | Sheet | No | No | Electron Beam | 4.1 | 5 μm | Minor | ○ | Inventive Example of Present Invention |
| 27 | Ti—0.25Fe—0.45Si | Sheet | No | No | Electron Beam | 3.5 | 30 μm | Minor | ○ | Inventive Example of Present Invention |
| 28 | Ti—0.9Al—0.45Si—0.25Nb | Sheet | No | No | Electron Beam | 5.0 | 10 μm | Minor | ○ | Inventive Example of Present Invention |
| 29 | Ti—4.5Al—2Fe—2Mo—3V | Sheet | No | No | Electron Beam | 5.0 | 10 μm | Minor | ○ | Inventive Example of Present Invention |
| 30 | Ti—20V—4Al—1Sn | Sheet | No | No | Electron Beam | 5.0 | 250 μm | Minor | ○ | Inventive Example of Present Invention |
| 31 | Ti—15V—3Cr—3Al—3Sn | Sheet | No | No | Electron Beam | 5.0 | 300 μm | Minor | ○ | Inventive Example of Present Invention |
| 32 | Ti—1.0Cu | Sheet | No | No | Electron Beam | 2.1 | 100 μm | Minor | ○ | Inventive Example of Present Invention |
| 33 | Ti—1.0Cu—0.5Nb | Sheet | No | No | Electron Beam | 4.1 | 100 μm | Minor | ○ | Inventive Example of Present Invention |
| 34 | Ti—1.0Cu—1.0Sn—0.45Si—0.2Nb | Sheet | No | No | Electron Beam | 4.1 | 60 μm | Minor | ○ | Inventive Example of Present Invention |

In the Inventive Examples of the present invention shown in Nos. 20 to 34, the thickness of the titanium sheets 4 attached to the titanium cast pieces 3 by welding was a sufficiently thick thickness of 2.1 to 6.5 μm, and the grain size of the sheets was also a sufficiently fine diameter of 5 to 300 μm, and hence the surface defects on the titanium sheets were minor and were of an equal level to the surface defects of the Conventional Example of No. 1 in Table 2.

REFERENCE SIGNS LIST

1, 2 Titanium material for hot rolling according to the present invention
3 Titanium cast piece (titanium slab)
3*a* Rolling surface
3*b* Side surface
4, 5 Titanium sheet
6 Weld zone (weld line)

The invention claimed is:

1. A titanium material for hot rolling, comprising:
   a titanium ingot, and
   a titanium sheet welded to a face corresponding to a surface of the titanium ingot that is to be rolled;
   wherein:
   the titanium ingot and the titanium sheet each have a chemical composition, both chemical compositions selected a composition from one of the following groups (1) to (3):
   (1) a commercially pure titanium specified by a standard from JIS or ASTM, or one of DIN Standards 3.7025, 3.7035, and 3.7055;
   (2) a titanium alloy specified by one of JIS Class 11, JIS Class 50, JIS Class 60, JIS Class 61, and JIS Class 80; or
   (3) a titanium alloy selected from the group consisting of: Ti-6Al-2Sn-4Zr-2Mo-0.08Si; Ti-6Al-5Zr-0.5Mo-0.2Si; Ti-8Al-1Mo-1V; Ti-1 to 1.5Fe-0.3 to 0.50-0.01 to 0.04N; Ti-1Cu; Ti-1Cu-0.5Nb; Ti-1Cu-1Sn-0.35Si-0.5Nb; Ti-6Al-2Sn-4Zr-6Mo; Ti-15V-3Cr-3Sn-3Al; Ti-20V-4Al-1Sn; Ti-10V-2Fe-3Al; and Ti-6Al-4V-10Cr-1.3C.

2. The titanium material for hot rolling according to claim 1, wherein:
   a thickness of the titanium sheet is within a range of 1 mm to 20 mm.

3. The titanium material for hot rolling according to claim 1, wherein:
   a grain size of the titanium sheet is less than 1 mm.

4. The titanium material for hot rolling according to claim 1, wherein:
   the titanium ingot is a titanium slab produced by electron beam remelting or plasma arc melting.

5. The titanium material for hot rolling according to claim 1, wherein the titanium sheet is welded to the face using electron beam welding, plasma arc welding or tungsten inert gas welding.

6. The titanium material for hot rolling according to claim 1, wherein the titanium sheet is welded to the face in a vacuum.

7. The titanium material for hot rolling according to claim 2, wherein:
   a grain size of the titanium sheet is less than 1 mm.

8. The titanium material for hot rolling according to claim 2, wherein:
   the titanium ingot is a titanium slab produced by electron beam remelting or plasma arc melting.

9. The titanium material for hot rolling according to claim 3, wherein:
   the titanium ingot is a titanium slab produced by electron beam remelting or plasma arc melting.

10. The titanium material for hot rolling according to claim 7, wherein:
    the titanium ingot is a titanium slab produced by electron beam remelting or plasma arc melting.

11. The titanium material for hot rolling according to claim 2, wherein the titanium sheet is welded to the face using electron beam welding, plasma arc welding or tungsten inert gas welding.

12. The titanium material for hot rolling according to claim 3, wherein the titanium sheet is welded to the face using electron beam welding, plasma arc welding or tungsten inert gas welding.

13. The titanium material for hot rolling according to claim 4, wherein the titanium sheet is welded to the face using electron beam welding, plasma arc welding or tungsten inert gas welding.

14. The titanium material for hot rolling according to claim 7, wherein the titanium sheet is welded to the face using electron beam welding, plasma arc welding or tungsten inert gas welding.

15. The titanium material for hot rolling according to claim 8, wherein the titanium sheet is welded to the face using electron beam welding, plasma arc welding or tungsten inert gas welding.

16. The titanium material for hot rolling according to claim 9, wherein the titanium sheet is welded to the face using electron beam welding, plasma arc welding or tungsten inert gas welding.

17. The titanium material for hot rolling according to claim 10, wherein the titanium sheet is welded to the face using electron beam welding, plasma arc welding or tungsten inert gas welding.

18. The titanium material for hot rolling according to claim 2, wherein the titanium sheet is welded to the face in a vacuum.

19. The titanium material for hot rolling according to claim 3, wherein the titanium sheet is welded to the face in a vacuum.

20. The titanium material for hot rolling according to claim 4, wherein the titanium sheet is welded to the face in a vacuum.

21. The titanium material for hot rolling according to claim 5, wherein the titanium sheet is welded to the face in a vacuum.

22. The titanium material for hot rolling according to claim 7, wherein the titanium sheet is welded to the face in a vacuum.

23. The titanium material for hot rolling according to claim 8, wherein the titanium sheet is welded to the face in a vacuum.

24. The titanium material for hot rolling according to claim 9, wherein the titanium sheet is welded to the face in a vacuum.

25. The titanium material for hot rolling according to claim 10, wherein the titanium sheet is welded to the face in a vacuum.

26. The titanium material for hot rolling according to claim 11, wherein the titanium sheet is welded to the face in a vacuum.

27. The titanium material for hot rolling according to claim 12, wherein the titanium sheet is welded to the face in a vacuum.

28. The titanium material for hot rolling according to claim 13, wherein the titanium sheet is welded to the face in a vacuum.

29. The titanium material for hot rolling according to claim 14, wherein the titanium sheet is welded to the face in a vacuum.

30. The titanium material for hot rolling according to claim 15, wherein the titanium sheet is welded to the face in a vacuum.

* * * * *